Jan. 2, 1968 H. G. DILL ET AL 3,361,591
PRODUCTION OF THIN FILMS OF CADMIUM SULFIDE, CADMIUM TELLURIDE OR CADMIUM SELENIDE
Filed April 15, 1964
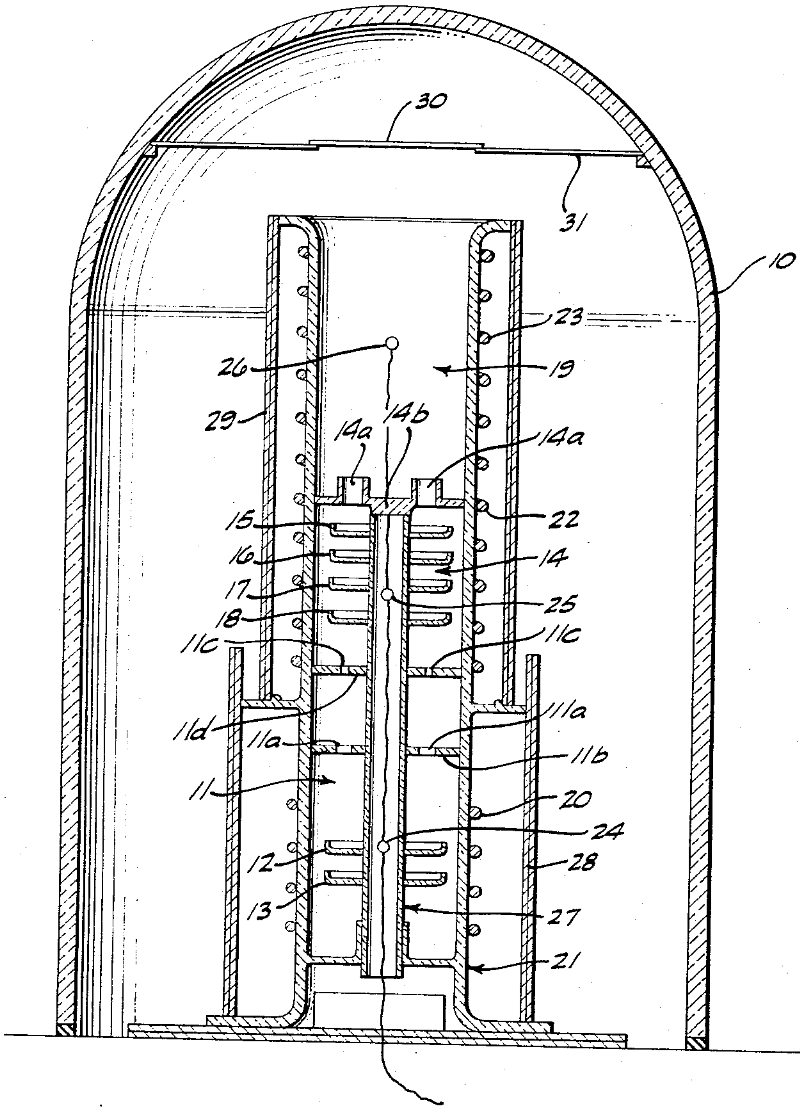
INVENTOR.
HANS G. DILL,
FRANK A. PIZZARELLO,
BY
John M. Koch
ATTORNEY.

United States Patent Office 3,361,591

Patented Jan. 2, 1968

3,361,591
PRODUCTION OF THIN FILMS OF CADMIUM SULFIDE, CADMIUM TELLURIDE OR CADMIUM SELENIDE

Hans G. Dill, Costa Mesa, and Frank A. Pizzarello, Santa Ana, Calif., assignors to Hughes Aircraft Company, Culver City, Calif., a corporation of Delaware Filed Apr. 15, 1964, Ser. No. 359,976
4 Claims. (Cl. 117—201)

ABSTRACT OF THE DISCLOSURE

A method for producing reproducible thin films of cadmium sulfide, cadmium telluride or cadmium selenide by vaporizing independent sources of cadmium and sulfur and depositing from the mixture thereof upon a suitable substrate in the desired proportion.

This invention relates to a method for producing reproducible thin films of cadmium sulfide having desirable electrical properties for the fabrication of thin film active electronic semiconductor devices. Cadmium sulfide generally is evaporated from a single cadmium sulfide material source to a substrate heated to a temperature which will yield film of the desired electrical and crystalline properties. Cadmium sulfide is completely dissociated in the gas phase to its constituent elements. Chemically this process can be described by the reaction:

$$2CdS_{(s)} \rightleftarrows 2Cd_{(g)} + S_{2(g)}$$

In the normal process of evaporation, cadmium sulfide is thus transported to the substrate in a dissociated form. Upon striking the cooler substrate surface, the cadmium and sulfur atoms lose the heat of vaporization and reunite to form cadmium sulfide. Thus, under conditions of normal vacuum evaporation, one of the elemental constituents can be preferentially lost from the main stream of the evaporated source, consequently leading to an excess of one constituent arriving at the substrate. This lack of stoichiometry in the gas phase subsequently deposits solid cadmium sulfide containing an excess of cadmium either in the form of a vacancy defect in the solid cadmium sulfide or as an intergranular matrix. Experimentally it has been found that generally the cadmium sulfide films contain a cadmium excess (sulfur vacancies). Thus, with the prior art methods of evaporation in use, there is a tendency to deposit films of cadmium sulfide containing excess cadmium. Such films have relatively low resistivities and the reproducibility of resistivity from one operation to another is very poor.

Accordingly, it is an important object of this invention to provide a process whereby the foregoing described effect is minimized or nullified by the coevaporation of sulfur and cadmium sulfide or sulfur and cadmium.

Another object of this invention is to provide a method for producing thin films of cadmium sulfide having relatively high resistivities and good reproducibility of resistivity.

Additional objects of this invention will become apparent from the following description, which is given primarily for purposes of illustration, and not limitation. The following illustration of a method for producing cadmium sulfide thin films is also illustrative of the similar methods for producing thin films of cadmium selenide and cadmium telluride.

In evaporating cadmium or cadmium sulfide, and sulphur separately, in accordance with the method and apparatus of this invention, the evaporator shown in the drawing is used. It is placed inside a vacuum chamber

10, which is evacuated. The evaporator is divided into three heating zones. Zone 11 is provided with the charge of sulfur, which is placed on trays 12 and 13. Into zone 14 is introduced a charge of cadmium sulfide or cadmium which is placed on trays 15, 16, 17 and 18. The number of trays is chosen to control the evaporation surface. Zone 19 serves the principal purpose of a sulfur vapor heating zone.

The temperature of zone 11 is elevated to the range of about 100° to 400° C. by electrical heating element 20 wrapped around tubular evaporator 21 to provide a steady stream of sulfur vapor through orifices **11*a* of separator 11*b* and orifices 11*c* of separator 11*d*, largely in the form of $S_8$. Separators 11*b* and 11*d* serve to separate zones 11 and 14**.

The temperature of zone 14 is raised to a value in the range of about 500° to 800° C. to provide a stream of cadmium sulfide or cadmium vapor through orifices **14*a* of separator 14*b* by heating element 22. Mixing of cadmium sulfide or cadmium vapor with sulfur vapor takes place in orifices 14*a***.

With the aid of heating element 23, zone 19 is maintained at about 700° to 1000° C., at which temperature the $S_8$ sulfur vapor is largely dissociated to $S_2$ vapor. A rich supply of $S_2$ vapor is thus produced in zone 19 to aid in the occurrence of the following reaction:

$$Cd_{(g)} + S_{2(g)} \rightleftarrows CdS_{(s)}$$

To prevent a major backflow of cadmium sulfide into the sulfur chamber 11, a pressure gradient is established from zone 11 to zone 19 by setting the temperatures of zones 11 and 14 so that a greater pressure originates in zone 11 through the evaporation of sulfur than that which originates in zone 14 through the evaporation of cadmium sulfide or cadmium. The pressure in zone 19 is smaller than that in zone 11 or zone 14 as no vapor originates in zone 19. Thermocouples 24, 25 and 26 are used to control the temperatures and resultant pressures in zones 11, 14 and 19, respectively.

The baffle and tray support 27 at the interior of evaporator 21 is made of quartz or tantalum and serves to mix the sulfur and cadmium sulfide or cadmium vapors. The evaporator tube or shell 21 is made of quartz. Heat shields 28 and 29 prevent the flow of cadmium vapor from zone 14 into sulfur zone 11. Sulfur evaporates under a pressure of 0.01 to 0.1 millimeter of mercury and a temperature of 100–200° C. Cadmium and sulfur vapor mix in cadmium sulfide or cadmium zone 14. Zone 19, with a separate heating element 23 assures an undisturbed flow of the mixture of cadmium sulfide or cadmium and sulfur vapor to the substrate 30 mounted inside vacuum chamber 10 on support means 31.

Among the advantages of using a separate cadmium sulfide or cadmium and sulfur evaporation source are the fact that the stoichiometric ratio of cadmium to sulfur can be adjusted as desired, and the use of pure cadmium sulfide or cadmium and sulfur assures control of the operation. Cadmium sulfide films are formed which show a significant increase in resistivity and good reproducibility of resistivity.

A similar system can be used for the separate evaporation of cadmium selenide or cadmium and selenium; or cadmium telluride or cadmium and tellurium to produce cadmium selenide and cadmium telluride thin films, respectively.

Obviously many other modifications and variations of the present invention are possible in the light of the above teachings. It is therefore to be understood that within the scope of the appended claims the invention can be practiced otherwise than as specifically described.

What is claimed is:

1. A method for producing thin films of cadmium salts of the group consisting of cadmium sulfide, selenide and telluride having electrical properties suitable for the fabrication of electronic semiconductor devices, which comprises the steps (a) evaporating an element selected from the group of sulfur, selenium and tellurium in a first chamber at a first pressure;

(b) passing the vapor thereof into a second chamber;

(c) evaporating the cadmium salt of said element into the second chamber at a lower pressure to prevent back flow into the first chamber; and (d) passing the mixed vapors of the salt and the element into a third chamber at a lower pressure and heating the mixture to disassociate the element; and (e) depositing the desired cadmium salt thin film from the mixture of vapors upon a suitable substrate.

2. The method according to claim 1 wherein the element is sulfur and the first chamber is heated to 100° to 400° C., the second chamber is heated to 500° to 800° C., and the third chamber is heated to 700° to 1000° C.

3. A method for producing thin films of cadmium salts of the group consisting of cadmium sulfide, selenide and telluride having electrical properties suitable for the fabrication of electronic semiconductor devices which comprises the steps (a) evaporating an element selected from the group consisting of sulfur, selenium and tellurium in a first chamber at a first pressure;

(b) passing the vapor thereof to a second chamber;

(c) evaporating the cadmium into the second chamber at a lower pressure to prevent back flow into the first chamber;

(d) passing the resulting mixed vapors of cadmium and the corresponding second element into a third chamber at a lower pressure and heating the mixture to disassociate the second element; and (e) depositing the desired cadmium salt thin film from the mixture of vapors upon a suitable substrate.

4. The method according to claim 3 wherein the element is sulfur and the first chamber is heated to 100° to 400° C., the second chamber is heated to 500° to 800° C., and the third chamber is heated to 700° to 1,000° C.

References Cited

UNITED STATES PATENTS

| | | | |
|---|---|---|---|
| 2,908,592 | 10/1959 | Stroche | 117—106 |
| 2,932,592 | 4/1960 | Cameron | 117—106 |
| 2,994,621 | 8/1961 | Hugle et al. | 117—201 |
| 3,226,253 | 12/1965 | Gobrecht | 117—106 |

ALFRED L. LEAVITT, *Primary Examiner.*

C. K. WEIFFENBACH, *Assistant Examiner.*